(12) United States Patent
Chapman

(10) Patent No.: US 7,210,336 B1
(45) Date of Patent: May 1, 2007

(54) GAS LINK LEAK EVACUATION AND MONITORING SYSTEM

(75) Inventor: Marcus D. Chapman, Kaufman, TX (US)

(73) Assignee: M-B-W Incorporated, Slinger, WI (US)

( * ) Notice: Subject to any disclaimer, the term of this patent is extended or adjusted under 35 U.S.C. 154(b) by 0 days.

(21) Appl. No.: 11/246,386

(22) Filed: Oct. 7, 2005

(51) Int. Cl.
*G01M 3/04* (2006.01)

(52) U.S. Cl. .................. 73/40; 73/40.5 R; 73/49.1; 73/49.2

(58) Field of Classification Search ............ 73/40, 73/40.5 R, 49.1, 49.2
See application file for complete search history.

(56) References Cited

U.S. PATENT DOCUMENTS

| | | | | |
|---|---|---|---|---|
| 2,383,455 | A | * | 8/1945 | Abadie ................. 73/152.13 |
| 2,819,609 | A | * | 1/1958 | Liebhafsky ............... 73/40.7 |
| 3,060,725 | A | * | 10/1962 | Bernard ................ 73/40.5 R |
| 3,402,596 | A | | 9/1968 | Woodruff |
| 3,459,036 | A | * | 8/1969 | Powell ................. 73/40.5 R |
| 3,772,909 | A | * | 11/1973 | Anderson ............... 73/23.41 |
| 3,964,292 | A | * | 6/1976 | Jackson ................ 73/40.5 R |
| 4,474,054 | A | * | 10/1984 | Ainlay .................. 73/49.2 |
| 4,646,069 | A | * | 2/1987 | Andrejasich et al. ....... 340/603 |
| 4,709,577 | A | * | 12/1987 | Thompson ................ 73/40.7 |
| 4,725,551 | A | * | 2/1988 | Thompson ................. 436/3 |
| 4,754,136 | A | | 6/1988 | Blakely |
| 4,855,714 | A | * | 8/1989 | Clarkson et al. ........... 340/521 |
| 4,872,490 | A | * | 10/1989 | Geisinger .................. 141/7 |
| 4,896,528 | A | | 1/1990 | Lewis |
| 5,046,353 | A | * | 9/1991 | Thompson ................ 73/40.7 |
| 5,048,324 | A | * | 9/1991 | Thompson ................ 73/40.7 |
| 5,076,728 | A | | 12/1991 | Golding |
| 5,293,771 | A | * | 3/1994 | Ridenour .................. 73/40 |
| 5,301,538 | A | | 4/1994 | Recla |
| 5,426,056 | A | * | 6/1995 | Nacson .................. 436/91 |
| 5,447,055 | A | * | 9/1995 | Thompson et al. ........... 73/49.2 |
| 5,918,271 | A | * | 6/1999 | McGuigan ................ 73/49.1 |
| 6,035,701 | A | | 3/2000 | Lowry et al. |
| 2003/0167861 | A1 | * | 9/2003 | Thompson et al. ........ 73/863.83 |

OTHER PUBLICATIONS

"Emergency Vacuum Making a Name in Lehigh Area", author and date unknown.
Omega Tools SerVac, SerVac™ Evacuator (Patent Pending); Portland, PA, author and date unknown.
"Bar Hole Purger, SPeeds Work, Cuts Costs", Health Consultants Incorporated.

* cited by examiner

*Primary Examiner*—Hezron Williams
*Assistant Examiner*—Samir M. Shah
(74) *Attorney, Agent, or Firm*—Andrus, Sceales, Starke & Sawall, LLP

(57) ABSTRACT

An apparatus and method for evacuating gas from the soil surrounding a leaking gas conduit utilizes non-sparking and static dissipating components to reduce the risk of an explosion. The evacuation of gas from probes in boreholes in the vicinity of the leak is induced solely by a downstream blower where air is mixed with the gas and the gas/air mixture monitored to maintain the gas concentration below potentially explosive levels.

10 Claims, 4 Drawing Sheets

GAS LINK LEAK EVACUATION AND MONITORING SYSTEM

BACKGROUND OF THE INVENTION

The present invention relates to an apparatus and method for rapidly and accurately pinpointing the location of an underground leak in a gas line in a manner that greatly reduces the risks of explosion.

Determining the location of a leak in an underground gas line has long posed difficult problems for gas line emergency repair crews. Although the leaking gas line itself is easily located, the permeation of the soil or other overlayer with gas from the leak makes it difficult to pinpoint the actual location of the leak. As a result, it has not been uncommon for large stretches of a surface, including paved roadways, to have to be excavated in a somewhat random fashion to locate the actual site of the leak. This, of course, is costly and time-consuming. In addition, the continuous leaking gas creates a greater hazard the longer the leak continues.

It is known in the prior art to use a so-called "bar hole purger" to remove gas from a small hole drilled near the suspected point of the leak. A compressor/venturi arrangement is connected to the bar hole probe to draw gas from the bore hole and, after the probe is withdrawn, the time it takes for gas to return to the bore hole gives an indication of how close the hole is to the actual leak. This system is slow and costly, in terms of the amount of machinery required to locate the leak. In addition, the system has no safeguards to protect against a possible ignition of an explosive gas/air mixture.

In one recently developed apparatus, a vacuum suction head is placed over each of a series of boreholes drilled at spaced intervals along the length of a leaking gas line in the general area of the leak. Each of the suction heads is attached by a flexible hose to a manifold which, in turn, is attached to a truck-mounted industrial vacuum apparatus. A source of compressed air is also connected to the upstream end of the manifold. Simultaneously, compressed air is supplied at 100 psi and 160 cfm to the manifold and the vacuum apparatus is run at full capacity (e.g., 750 cfm) to the vacuum hopper. The combined airflow generated by the compressed air and the vacuum drawn by the vacuum apparatus draws gas in the underlying soil from the boreholes to the suction heads to rapidly evacuate gas in the areas of the boreholes. After gas is evacuated from the boreholes, the suction heads are removed and probes with gas sensors are inserted into the boreholes to measure gas levels. Because permeating gas will return more quickly to the boreholes closest to the leak, the position of the leak can be quickly determined. The initial readings of gas levels in the boreholes may also be used to reposition the suction heads, including drilling additional boreholes closer to the indicated position of the leak. The system is also used to generally evacuate gas that has permeated the soil around a leak in a gas line in order to minimize the toxic and explosive hazards to buildings and the like in the area.

The above described system suffers from a number of deficiencies. The system requires the infusion of substantial compressed air volumes into the evacuation line. The system is operated for a period of time (e.g., five minutes) estimated to be sufficient to evacuate gas from all the boreholes. Finally, the large vacuum hopper typically used with these vacuum systems provides a large volume that could potentially be the source of an explosive gas/air mixture, the ignition of which could be precipitated by a spark or static electric discharge.

The apparatus and method of the present invention address and correct the deficiencies in the prior art.

SUMMARY OF THE INVENTION

The apparatus of the present invention is used to evacuate gas from soil or other porous overlayer surrounding a leaking gas conduit to assist in locating the leak and to minimize the risk of igniting an explosive gas/air mixture. The apparatus includes a plurality of gas probes, each of which is adapted to be operatively connected to a borehole in the soil, each probe having an inlet for admission of gas from the soil. A common header and flexible lines interconnect the probes and include a connection at a downstream end to a vacuum source to draw gas from the soil surrounding the boreholes. Demountable fittings and connectors are provided for interconnecting the header and lines with the probes and the vacuum source. The probes, fittings and connectors are made of non-sparking materials. The lines, which are preferably flexible, have a static dissipating construction.

The vacuum source is also adapted to draw ambient air to mix with the gas from the boreholes. Preferably, an airflow control valve is provided to vary the volume of air mixed with the gas. A monitoring device is used to measure and facilitate management of an output of gas concentration in the air/gas mixture. The apparatus may also include an alarm device that is operatively connected to the monitoring device to output an alarm at a preselected gas concentration. The output may also be made operative to shut down the apparatus.

In a preferred embodiment, the common header and the flexible lines comprise a flexible common header for serially connected probes.

In accordance with another embodiment of the invention, the apparatus includes a plurality of gas probes, each of which is connected to a borehole in the soil and has an inlet for admission of gas from the soil. A common header and flexible lines interconnect the probes and include a connection at a downstream end to a vacuum source to draw gas from the soil surrounding the boreholes. The vacuum source is adapted to draw ambient air to mix with the gas and an airflow control valve is operative to vary the volume of air mixed with the gas. A monitoring device measures and provides an output of gas concentration in the air/gas mixture.

The apparatus of the foregoing embodiment preferably also includes demountable fittings and connectors for interconnecting the header and lines with the probes and the vacuum source. The probes, fittings and connectors are made of non-sparking materials. In addition, the lines are flexible and have a static dissipating construction. The monitoring device and flow control valve, in a further embodiment, are operatively connected to maintain a gas concentration in the mixture below a preselected maximum.

Also in accordance with the present invention, a method is disclosed for evacuating gas from soil or other porous overlayer surrounding a leaking gas conduit to assist in locating the leak and minimizing the risk of igniting an explosive gas/air mixture. The method preferably includes the steps of (1) forming a plurality of boreholes in the overlayer in the proximity of the leak, (2) inserting probes having gas inlets into the boreholes, (3) connecting the probes to a common header, (4) drawing a vacuum on the downstream end of the header to draw gas from the probes in the boreholes, (5) simultaneously using the vacuum to draw ambient air and mixing the air with the gas, (6) monitoring the concentration of gas in the gas/air mixture, (7) discontinuing the vacuum when the gas concentration approaches 0, (8) testing the boreholes for the return presence of gas, (9) using the timing of the return presence of gas to more accurately determine the location of the leak, and (10) repeating steps (2)–(9).

Preferably, the repetition of steps (2)–(9) includes the step of forming additional boreholes closer to the location of the leak based on the results of step (9). The method may also include the step of generating an alarm when the gas concentration reaches a preselected level. The method may also include the step of automatically shutting down the vacuum drawing step when the gas concentration reaches a preselected level. The method further preferably includes the step of adjusting the volume of ambient air mixed with the gas to maintain a gas concentration below a preselected maximum.

DETAILED DESCRIPTION OF THE PREFERRED EMBODIMENTS

Figure 1:
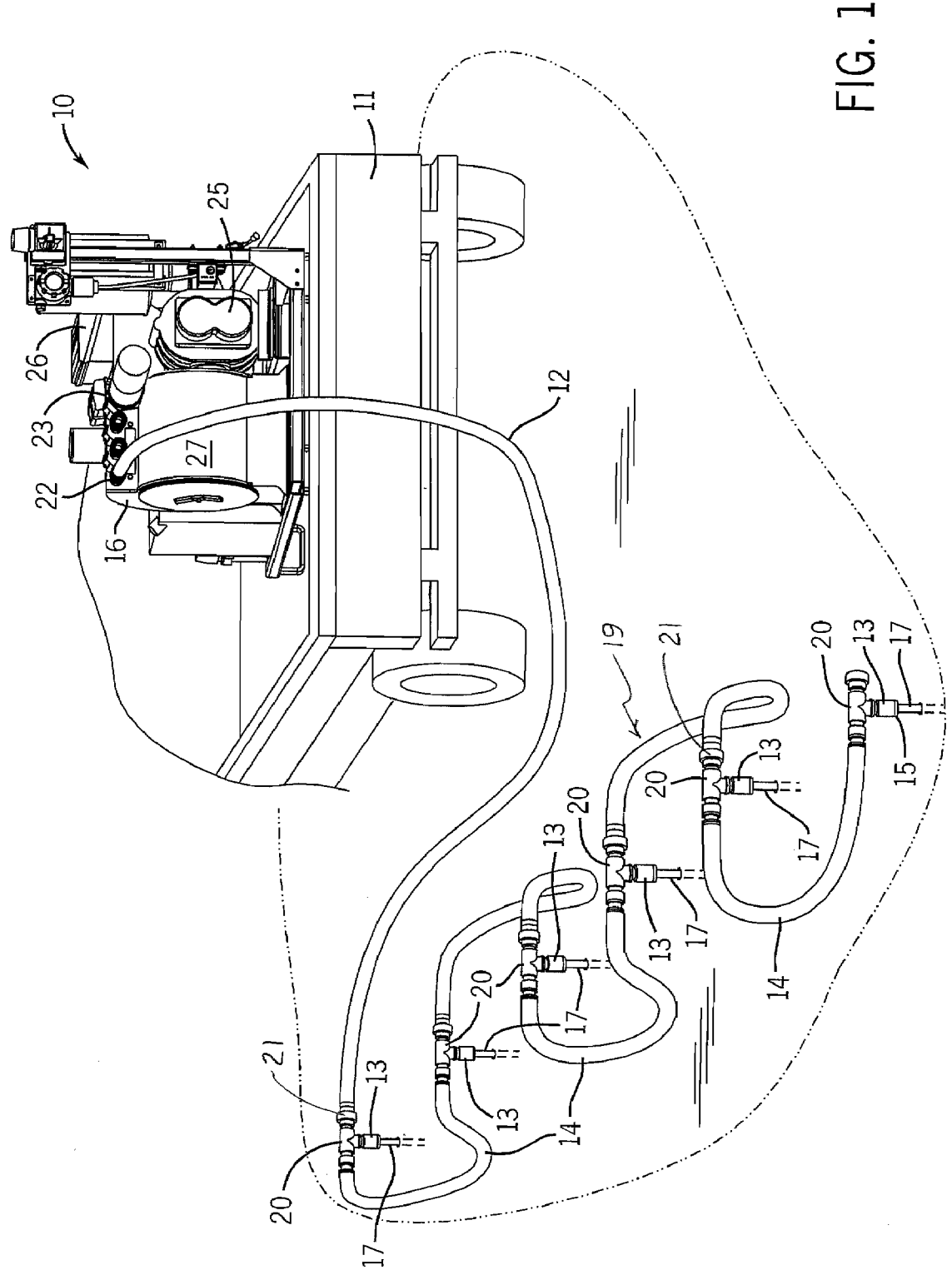
FIG. 1 is a rear perspective view of a vacuum unit used in the apparatus of the present invention mounted on a truck and operatively connected to an arrangement of gas removal probes positioned generally along the line of a leaking underground gas conduit.

Referring initially to FIG. 1, there is shown a vacuum unit 10 of the present invention mounted on the rear of a truck 11 with a flexible gas evacuation line 12 attached to a plurality of serially connected gas probes 13 mounted in boreholes extending through a paved surface and generally aligned with an underground gas conduit (not shown). In FIG. 1, there are shown six gas probes 13, each adjacent pair of which is interconnected with a flexible connecting line 14. The connecting lines 14 and connectors at the top of each probe 13 comprise what might be characterized as a common flexible header 19 for the plurality of probes 13. The downstream-most probe 15 is connected at one end to the gas evacuation line 12, the opposite end of which line is connected to a gas inlet manifold 16 on the vacuum unit 10.

Figure 4:
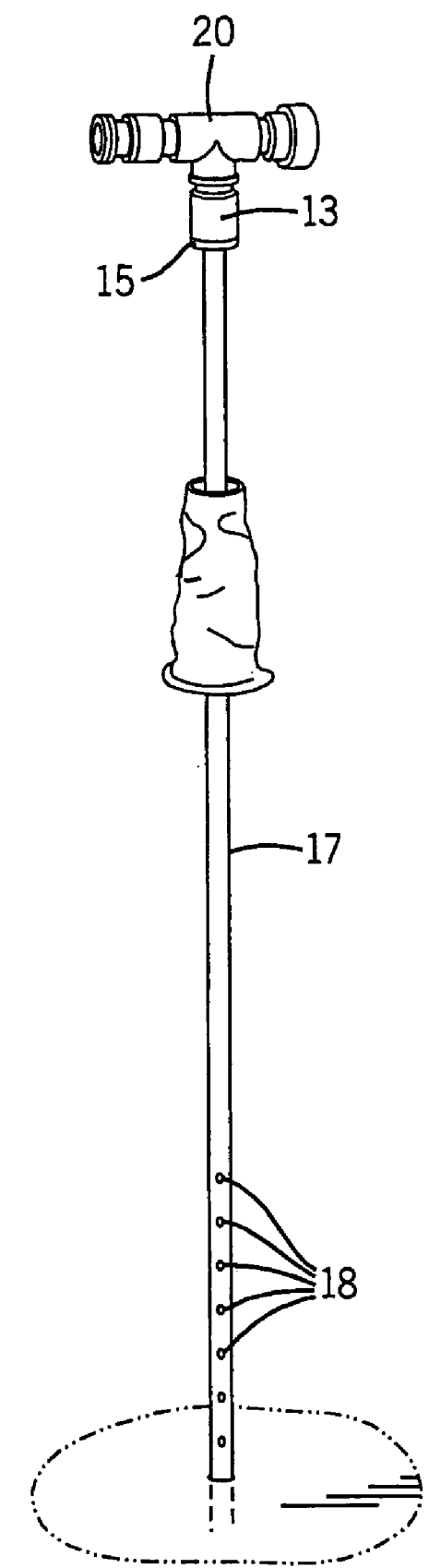
FIG. 4 is an elevation view of one of the gas evacuation probes shown partially inserted in a borehole drilled through a paved surface.

Referring also to FIG. 4, the gas probe 13 comprises a hollow tube 17 made of aluminum or another non-sparking metal or material. The tube 17 may be of any convenient length, for example, about four feet, with the lower end portion of about one foot provided with a series of axially spaced gas inlet holes 18. In use, the probe 13 is inserted to nearly its full length into a pre-drilled borehole through the pavement or other surface overlying the gas conduit where a leak has been detected. The upper portion of the tube 17 may be provided with a flexible boot or bellows-type sealing member to help prevent the escape of gas or the ingress of ambient air into the borehole. A T-joint 20 at the top of the tube 17 includes quick connectors 21 for rapid attachment of the flexible connecting lines 14, each of which carries a complimentary connector half at its opposite ends. One-half of the T-joint 20 on the downstream-most probe 15 includes a quick connector 21 for attachment to the gas evacuation line 12 which carries gas evacuated from all six boreholes to the vacuum unit 10. The joints 20 and connectors 21 are also made of non-sparking metal, such as brass or other suitable non-sparking materials. The non-sparking materials used for the probe tubes 17, T-joints 20 and connectors 21 are all intended to minimize the possibility of a spark-induced gas explosion. In addition, all of the flexible gas lines, including the downstream gas evacuation line 12 and the connecting lines 14 are of a static-dissipating construction, again to minimize the possibility of a static-induced spark. One such static-dissipating construction includes a continuous conductive wire embedded in the flexible material from which the line is made that helps prevent the buildup of a static charge.

Figure 2:
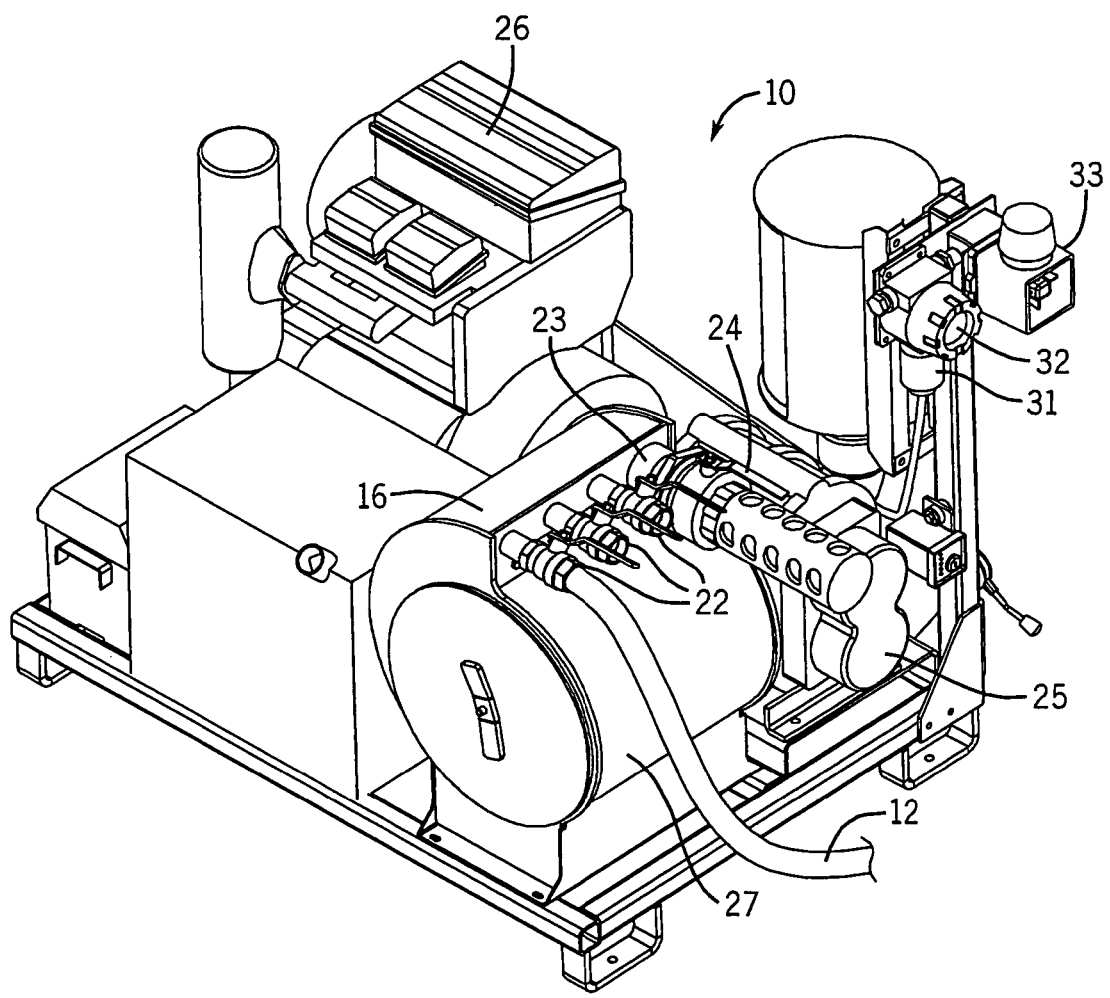
FIG. 2 is a perspective view of the vacuum unit positioned generally as shown in FIG. 1.
Figure 3:
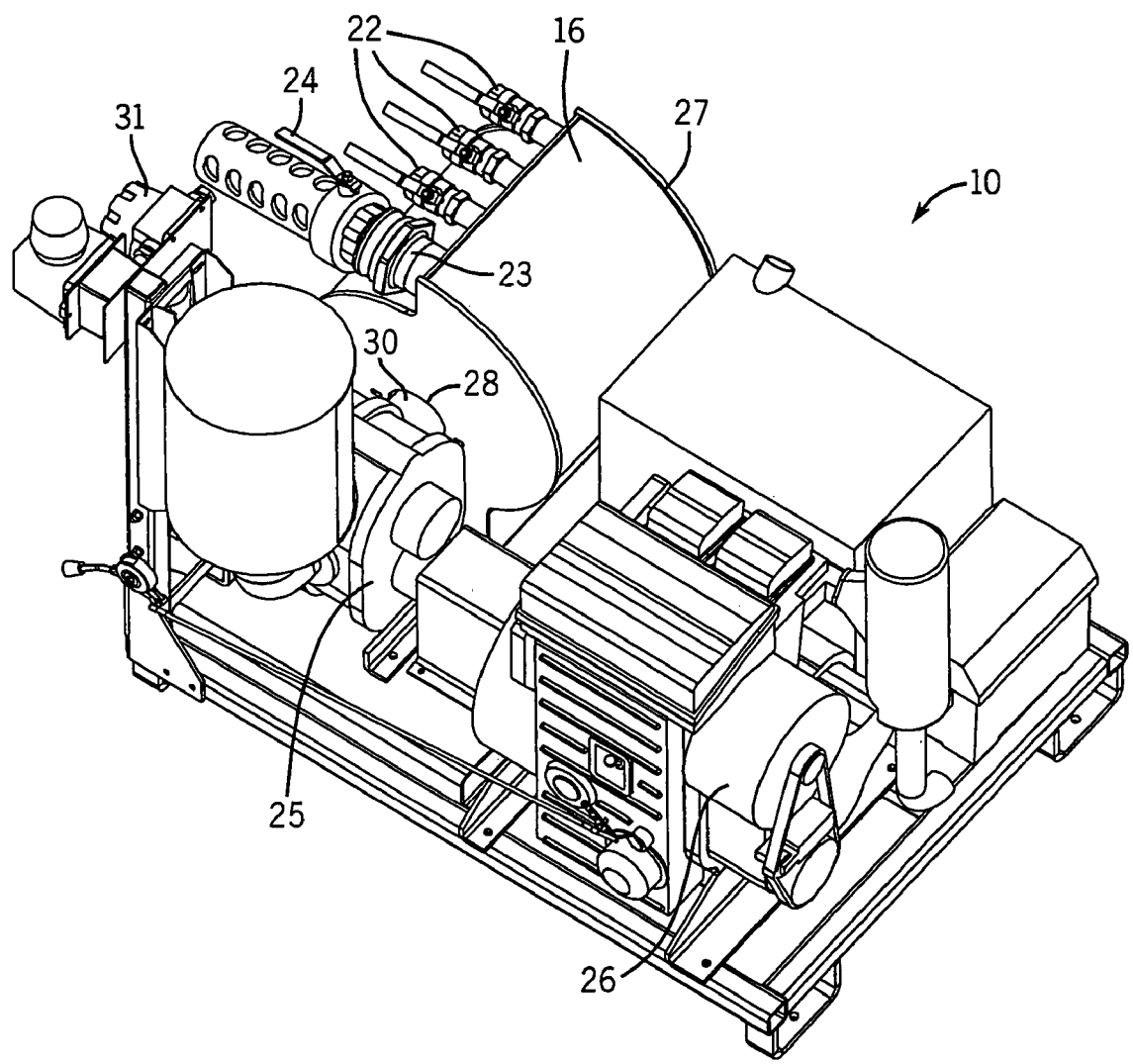
FIG. 3 is a perspective view of the vacuum unit from a position generally opposite that of FIG. 2.

Referring also to FIGS. 2 and 3, the vacuum unit 10 includes the previously identified gas inlet manifold 16 which, in the embodiment shown, provides inlet connections 22 for up to four gas evacuation lines 12. Preferably, the inlet manifold 16 is formed as an integral part of a generally cylindrical filter housing 27. One end of the manifold 16 includes an ambient air inlet 23 to bring outside air to mix with the gas in the manifold. The ambient air inlet 23 is operated by a manual flow control valve 24 to assist in controlling the gas/air mixture as will be described in more detail below.

The system vacuum is generated by a positive displacement blower 25 driven by a gasoline engine 26 or other prime mover. Operation of the blower 25 draws a mixture of gas and air from the manifold 16 tangentially into the filter housing 27 where particulates and other foreign matter in the gas/air mixture are separated from the mixture to prevent damage to the blower 25. The blower 25 may have a capacity of 800 cfm and be driven by a 24 hp engine 26. The blower capacity is sufficient to simultaneously operate well in excess of six gas probes 13 and it is anticipated that the vacuum system would be adequate to operate as many as four lines of six probes each.

The gas/air mixture exiting the filter housing 27 passes through an exhaust conduit 28 which is connected directly to the blower inlet 30. A gas concentration monitor 31 is tapped into and receives a gas/air sample from the exhaust conduit 28. The gas concentration monitor 31 may have a direct readout 32 of the concentration and may also output electronic signals representative of the concentration. One such output signal is used to generate an alarm as the gas concentration approaches the level of a potentially explosive mixture. Another output may be used to trigger a second alarm and/or to shut off the engine 26 and the vacuum unit 10 at a preselected concentration level. The gas concentration signals may also be utilized to operate an automatic flow control valve (not shown) to automatically adjust the inflow of ambient air in response to fluctuations in the inflow of gas to maintain a constant safe operating range of gas concentration. Signals may also be used to operate a light and audible alarm 33.

In operation, the gas evacuation apparatus of the present invention is adapted to be quickly deployed at the location of an underground gas leak which is typically located by the distinctive odor of natural gas, more correctly the distinctive odor imparted to otherwise odorless natural gas to make it detectible. The location (line and depth) of the leaking conduit is typically known to the emergency crew dispatched to the site. A number of boreholes are drilled along the length of the conduit over the suspected position of the leak and at a selected spacing (e.g., ten feet). The gas probe tubes 17 are inserted in the boreholes and, after connecting the gas evacuation line 12 from the downstream most probe 13 to the inlet connection 22 of the inlet manifold 16, the vacuum unit 10 is started and operated to draw the leaking gas from the boreholes. The flow control valve 24 may be adjusted as necessary to set and keep the concentration of gas well below the approximate 5% concentration level of a potentially a-explosive mixture. Preferably, the concentration is maintained at 3% or less. The vacuum unit 10 may be operated for a preselected period of time or, more preferably, operated until the readout 32 shows no gas present in the exhaust conduit 28.

The actual concentration of gas sufficient to create a potentially explosive mixture will depend on other variables, such as humidity and oxygen concentration in the air. This is sometimes referred to as the "lower explosive limit" or LEL. Thus, in a presently preferred embodiment of the invention, the gas concentration monitor 31 includes a catalytic sensor that determines the LEL for a given set of conditions. The monitor generates a signal based on a selected percent LEL to set an alarm threshold or thresholds. For example, if the sensor determines an LEL of 5.5%, a first alarm threshold might be set at 50% LEL which corresponds to a concentration of 2.75%. Another higher threshold could, for example, be set at 75% LEL from which a signal operative to shut down the engine could be generated.

At this time, the probes 13 are individually removed from the boreholes as rapidly as practicable and gas sensors are inserted into the boreholes. The continued flow of gas from the leak will reappear in the borehole or holes closest to the leak, thereby enabling the exact location of the leak to be pinpointed very closely. If necessary, additional boreholes may be drilled closer to the suspected location of the leak and the vacuum unit 10 operated to again evacuate the boreholes, after which the probes are again removed and gas sensors inserted into the boreholes.

It has been found that the method of the present invention results in an ability to pinpoint a leak within one or two feet of its exact location before the overlayer, often including a paved surface, is excavated.

The use of a gas concentration monitoring device 31 provides a number of operational advantages. Careful monitoring of the gas concentration in the gas/air mixture is used to generate alarm signals when the concentration reaches a threshold level. The signals can be used to generate an alarm and may also be observed on the readout 32. An increase in gas concentration to a potentially explosive level may be used to generate a further alarm and/or to shut down the vacuum unit 10. Monitoring the gas concentration also provides an indication that evacuation of gas from the boreholes is complete when the monitored concentration approaches 0.

The use of non-sparking components 13, 20, 21 and 22 and static dissipating lines 12 and 14 minimizes the possibility of a gas-igniting spark or static discharge being generated. Furthermore, the vacuum unit 10 is operated without a large volume vacuum hopper which could potentially be filled with an explosive gas/air mixture. However, monitoring and controlling the gas concentration virtually eliminates the risk of such an occurrence.

The apparatus and method of the present invention also has significant utility in evacuating gas from a leak which can migrate through the soil and pool under a paved surface, building foundation or other solid structure. Using the probe and header line apparatus described above, leaking gas permeating the soil adjacent to or under a building or other structure can be rapidly and safely evacuated.

It should also be noted that the gas probes 13 described above are only exemplary and other probe or suction head constructions may be used, depending on such variables as pavement type, soil type, soil moisture conditions and other sub-surface characteristics. One prior art apparatus, for example, includes a very short length probe and a seal arrangement at the top to mitigate the inflow of ambient surface air into the vacuum line. In any event, however, it is believed to be important to construct the probe and its flow connections from non-sparking materials.

What is claimed is:

1. An apparatus for evacuating gas from soil or other porous overlayer surrounding a known leaking gas line to assist in locating the leak and minimize the risk of igniting an explosive gas/air mixture, said apparatus comprising:
   a plurality of conduits for admission of gas from the soil, said conduits connected to a vacuum source to draw gas from the soil surrounding the conduits and ambient air to mix with the gas;
   an air flow control valve operative to vary the volume of air mixed with the gas;
   a monitoring device for measuring and providing an output of gas concentration in the air/gas mixture;
   an alarm device operatively connected to the monitoring device to output an alarm at a preselected gas concentration; and,
   wherein the output is operative to shut down the apparatus.

2. The apparatus as set forth in claim 1 wherein the vacuum source comprises an engine driven blower.

3. An apparatus for evacuating gas from soil or other porous overlayer surrounding a leaking gas conduit to assist in locating the leak and minimize the risk of igniting an explosive gas/air mixture, said apparatus comprising:
   a plurality of conduits for admission of gas from the soil;
   said conduits having a connection at a downstream end to a vacuum source to draw gas from the soil surrounding the conduits;
   said vacuum source adapted to draw ambient air to mix with the gas;
   an airflow control valve for varying the volume of air mixed with the gas; and,
   a monitoring device for measuring and providing an output of gas concentration in the air/gas mixture, the monitoring device and air flow control valve operatively connected to maintain a gas concentration in the gas/air mixture below a preselected maximum.

4. The apparatus as set forth in claim 3 including demountable fittings and connectors for interconnecting the header and lines with the probes and the vacuum source, said probes, fittings and connectors made of non-sparking materials.

5. The apparatus as set forth in claim 3 wherein the lines are flexible and have a static dissipating construction.

6. A method for evacuating gas from soil or other porous overlayer surrounding a leaking gas conduit to assist in locating the leak and minimizing the risk of igniting an explosive gas/air mixture, said method comprising the steps of:
   (1) forming a plurality of boreholes in the overlayer in the proximity of the leak;
   (2) inserting probes having gas inkts into the borehoks;
   (3) connecting the probes to a common header;
   (4) drawing a vacuum on the downstream end of the header to draw gas from the probes in the boreholes;
   (5) simultaneously using the vacuum to draw ambient air and mixing the air with the gas;

(6) monitoring the concentration of gas in the gas/air mixture;

(7) discontinuing the vacuum when the gas concentration approaches 0;

(8) testing the boreholes for the return presence of gas;

(9) using the timing of the return presence to more accurately determine the location of the leak; and,

(10) repeating, if necessary, steps (2)–(9).

7. The method as set forth in claim 6 wherein the repeating step comprises forming additional boreholes closer to the location of the leak based on the results of step (9).

8. The method as set forth in claim 6 including the step of generating an alarm when the gas concentration reaches a preselected level.

9. The method as set forth in claim 6 including the step of automatically shutting down the vacuum drawing step when the gas concentration reaches a preselected level.

10. The method as set forth in claim 6 including the step of adjusting the volume of ambient air mixed with the gas to maintain a gas concentration below a preselected maximum.

* * * * *

UNITED STATES PATENT AND TRADEMARK OFFICE
CERTIFICATE OF CORRECTION

PATENT NO. : 7,210,336 B1 Page 1 of 1
APPLICATION NO. : 11/246386
DATED : May 1, 2007
INVENTOR(S) : Marcus D. Chapman It is certified that error appears in the above-identified patent and that said Letters Patent is hereby corrected as shown below:

Column 6, line 61, change "borehoks" to --boreholes--.

Signed and Sealed this

Twenty-first Day of August, 2007

JON W. DUDAS
*Director of the United States Patent and Trademark Office*